United States Patent
Thubert et al.

(10) Patent No.: US 10,904,157 B2
(45) Date of Patent: Jan. 26, 2021

(54) TELEMETRY FOR CLOUD SWITCHES QUEUING EXCURSION

(71) Applicant: Cisco Technology, Inc., San Jose, CA (US)

(72) Inventors: Pascal Thubert, La Colle-sur-Loup (FR); Jerome Henry, Pittsboro, NC (US); Robert E. Barton, Richmond (CA)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 16/376,617

(22) Filed: Apr. 5, 2019

(65) Prior Publication Data

US 2020/0322281 A1    Oct. 8, 2020

(51) Int. Cl.
| | | |
|---|---|---|
| *H04W 24/04* | (2009.01) | |
| *H04L 12/875* | (2013.01) | |
| *H04L 12/841* | (2013.01) | |
| *H04L 12/863* | (2013.01) | |
| *H04L 12/935* | (2013.01) | |
| *H04L 12/825* | (2013.01) | |
| *H04L 12/861* | (2013.01) | |
| *H04L 12/26* | (2006.01) | |
| *H04L 12/931* | (2013.01) | |

(52) U.S. Cl.
CPC .......... *H04L 47/56* (2013.01); *H04L 43/0894* (2013.01); *H04L 43/16* (2013.01); *H04L 47/25* (2013.01); *H04L 47/283* (2013.01); *H04L 47/6255* (2013.01); *H04L 49/3027* (2013.01); *H04L 49/35* (2013.01); *H04L 49/90* (2013.01)

(58) Field of Classification Search
CPC ....... H04L 47/56; H04L 47/25; H04L 47/283; H04L 43/0894; H04L 43/16
See application file for complete search history.

(56) References Cited

U.S. PATENT DOCUMENTS 6,795,447 B2    9/2004  Kadambi et al.
7,453,798 B2   11/2008  Bradford et al.
(Continued)

OTHER PUBLICATIONS

Dalvadi, Darshna and Dr. Keyur Shah "Using Adaptive Server Activation/Deactivation for Load Balancing in Cloud-Based Content Delivery Networks"; airccj.org, CS & IT-CSCP (2015); pp. 21-25.

(Continued)

*Primary Examiner* — Wei Zhao
(74) *Attorney, Agent, or Firm* — Merchant & Gould P.C.

(57) ABSTRACT

Telemetry for cloud switches queuing excursion may be provided. A first hysteresis threshold and a second hysteresis threshold for a queue of the network switch may be specified. Next, a queue position relative to the first hysteresis threshold and the second hysteresis threshold may be determined for each incoming packets for the queue. A number of crossings including the queue position passing the first hysteresis threshold and subsequently passing the second hysteresis threshold in a first predetermined time period may be determined. A number of data packets being sent to the queue of the network switch may then be altered based on one or more of the number of crossings, the first hysteresis threshold, and the second hysteresis threshold.

20 Claims, 5 Drawing Sheets

(56) References Cited

U.S. PATENT DOCUMENTS

| | | | | |
|---|---|---|---|---|
| 8,000,247 B2* | 8/2011 | Urano | ............. | H04L 47/215 |
| | | | | 370/235.1 |
| 10,243,789 B1* | 3/2019 | Naylor | ............. | H04L 63/02 |
| 2016/0353462 A1* | 12/2016 | Jiang | ............. | H04W 72/10 |

OTHER PUBLICATIONS

Shorgin, Sergey & V. Pechinkin, Alexander & Samouylov, Konstantin & Gaidamaka, Yuliya & Gudkova, Irina & Sopin, Eduard. (2015). Threshold-based queuing system for performance analysis of cloud computing system with dynamic scaling. AIP Conference Proceedings. 1648.250005-1-250005. 10.1063/1.4912509. 4 pages.
https://people.ucsc.edu/~warner/Bufs/queue-monitor.html; "Monitoring buffer queues" [online accessed Jan. 24, 2019] 3 pages.
https://www.arista.com/en/solutions/software-defined-network-telemetry; "Arista Telemetry—White Paper" Feb. 1, 2017; 9 pages.
https://toolsietiorg/html/draft-brockners-inband-oam-data-07#section-4; "Data Fields for In-situ OAM draft-brockners-inband-oam-data-07" Jul. 2, 2017; 29 pages.

* cited by examiner

TELEMETRY FOR CLOUD SWITCHES QUEUING EXCURSION

TECHNICAL FIELD

The present disclosure relates generally to data storage.

BACKGROUND

A data center is a facility used to house computer systems and associated components, such as a network fabric and storage systems. It generally includes redundant or backup power supplies, redundant data communications connections, environmental controls (e.g., air conditioning, fire suppression) and various security devices.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

Figure 1:
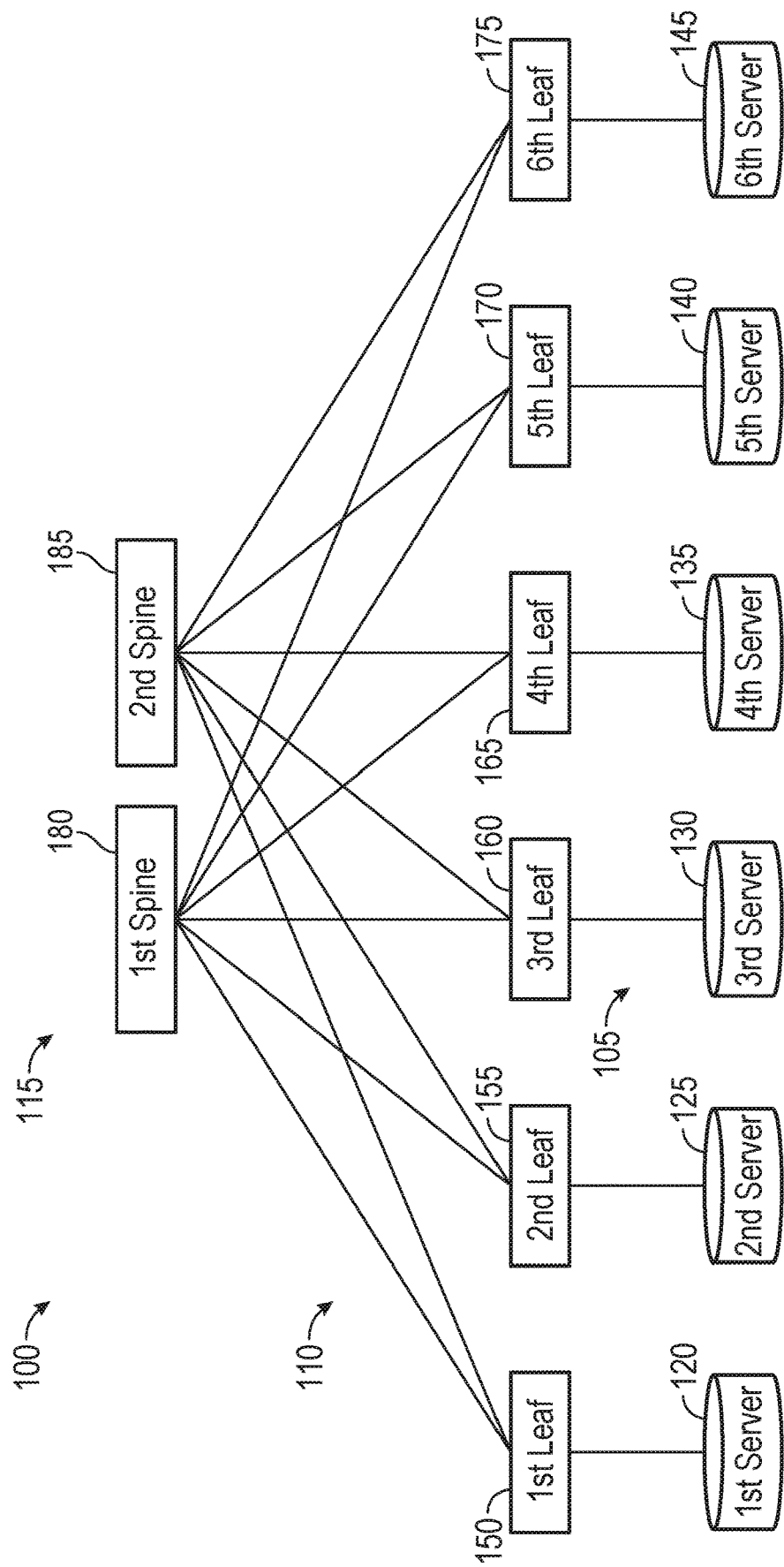
FIG. 1 is a block diagram of a data center.

Telemetry for cloud switches queuing excursion may be provided. A first hysteresis threshold and a second hysteresis threshold for a queue of a network switch of the network fabric may be specified. Next, a queue position relative to the first hysteresis threshold and the second hysteresis threshold may be determined for each incoming packets for the queue. A number of crossings including the queue position passing the first hysteresis threshold and subsequently passing the second hysteresis threshold in a first predetermined time period may be determined. A number of data packets being sent to the queue of the network switch may then be altered based on one or more of the number of crossings, the first hysteresis threshold, and the second hysteresis threshold.

Both the foregoing overview and the following example embodiment are examples and explanatory only, and should not be considered to restrict the disclosure's scope, as described and claimed. Further, features and/or variations may be provided in addition to those set forth herein. For example, embodiments of the disclosure may be directed to various feature combinations and sub-combinations described in the example embodiment.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

A network fabric of a data center may include approximately 500 to 1,000 leaf switches and 8 to 16 spine switches. Each leaf switch may be connected to approximately 32 to 98 servers. Each server in turn may be hosting approximately 20 virtual servers (e.g., endpoints), which may estimate to approximately 1,000 to 2,000 end points per leaf switch. This complexity may create a lack of visibility in functioning of the network fabric of the data center. In addition, the presence of such a large number of switches and a large number of endpoints for each of the switches may make it harder to trace performance of each switch.

Some conventional switch management processes employ a hysteresis based reporting structure for queue occupancy at the switches. However, such conventional processes merely report a count of the queue occupancy passing a high water mark in a given time period. Such limited information may not be useful in identifying a failing switch or in balancing loads on the switches. In addition, such processes do not provide a reliable way to determine the high water mark.

Embodiments of the present disclosure may provide processes to manage performance of switches of a network fabric of a data center. A first threshold and a second threshold may be specified for a flow of a queue at a switch of the network fabric of the data center. The hysteresis thresholds may be applied to a queue size at a transmit queue enqueue time, to a latency in the queue between a data packet enqueue time and a dequeue time, or both.

A relative position and a latency may be determined for each incoming data packets for the flow. The relative position may be determined by comparing the queue size at a time of enqueing of the incoming data packet with the hysteresis thresholds thus determining whether the queue size is above, below, or between the hysteresis thresholds. In addition, the incoming data packet may be tagged with a time of enqueueing. The latency may then be determined at a time of dequeueing as a time gap between the time of enqueueing and the time of dequeueing of the data packet. The latency may therefore represent an amount of time the incoming data packet spent in the queue. The relative position and the latency data may be collected in two metrics. Each of the two metrics may further be associated with a counter. The counter may be incremented once for the flow when a measured value passes the first hysteresis threshold and then passes the second threshold. The counters may provide a count of a number of crossings, that is, a number of times the flow suffered the jitter specified by a gap in the two hysteresis thresholds for the flow. The counters, therefore, may provide an indication of whether a load at the network switch is constant or erratic.

In example embodiments, the hysteresis thresholds may be dynamically adjusted for the flow. For example, the hysteresis thresholds may be dynamically adjusted by determining an integral of the queue level curve by taking the aggregate queue levels for a predetermined time period. That is, when the queue gets less used, the hysteresis thresholds may be lowered, and reciprocally, when the queue gets more used, the hysteresis thresholds may be increased and more widely spaced. The dynamic adjustment of the hysteresis thresholds may result in the thresholds staying relevant to an amount of traffic at the network switch and being traversed on a regular basis for the counters to keep counting.

In example embodiments, the hysteresis thresholds may be dynamically adjusted using a learning process. For example, a learning process may be trained based on historical data of the hysteresis thresholds. The learning process may then be used to predict the hysteresis thresholds. The predicted hysteresis thresholds, therefore, may provide an indication of the latency or a load at a network switch in the predetermined time period, which may be used to alter the load at the network switch. For example, a number of incoming data packets at the switch may be altered to balance the latency or the load at the network switch may be altered by redirecting the incoming data packets bound for the network switch.

FIG. 1 is a block diagram of a data center 100 including a network in accordance with embodiments of the disclosure. As shown in FIG. 1, data center 100 may comprise a plurality of servers 105, a plurality of leaf switches 110, and a plurality of spine routers 115. Plurality of servers 105 may comprise, but are not limited to, a first server 120, a second server 125, a third server 130, a fourth server 135, a fifth server 140, and a sixth server 145. Plurality of leaf switches 110 may comprise, but are not limited to, a first leaf switch 150, a second leaf switch 155, a third leaf switch 160, a fourth leaf switch 165, a fifth leaf switch 170, and a sixth leaf switch 175. Plurality of spine routers 115 may comprise, but are not limited to, a first spine switch 180 and a second spine switch 185. In example embodiments, a network connecting plurality of servers 105 to plurality of leaf switches 110, and connecting plurality of leaf switches 110 to plurality of spine routers 115 may also be referred to as a data center network or as a network.

The network shown in FIG. 1 may comprise, but is not limited to, a Clos network or a Fat-Tree network. A Fat Tree network may emulates a very large switch by interleaving many smaller switches, resulting in much lower cost and higher scalability. The benefits of Fat Tree networks may include, but not limited to, availability of equal cost multipath based switching fabric, a simplified network, and a fully utilized link bandwidth on each network node. A Fat Tree may also allow the networks to scale and grow incrementally on demand. The network of FIG. 1 may be organized into two or more stages, but resolve connectivity-wise to two stages as illustrated above, with a Superspine layer (i.e., Top of Fabric or ToF in RIFT) at the north, which may be fully meshed to a Leaf layer south. As shown in FIG. 1, plurality of spine routers 115 may comprise the aforementioned Superspine layer and the plurality of leaf switches 110 may comprise the aforementioned Leaf layer.

Each of plurality of servers 105 may connect to a respective one of plurality of leaf switches 110. Plurality of leaf switches 110 may implement layer 2 bridging and layer 3 routing functions. Each of plurality of leaf switches 110 may connect to each of plurality of spine routers 115. Plurality of spine routers 115 may provide redundant paths and connectivity in data center 100. For example, plurality of spine routers 115 may include a plurality of ports operative to receive data packets and forward the received data packets to destination addresses. The connections between plurality of leaf switches 110 and plurality of spine routers 115 may illustrate connectivity and may not comprise actual links.

Figure 2:
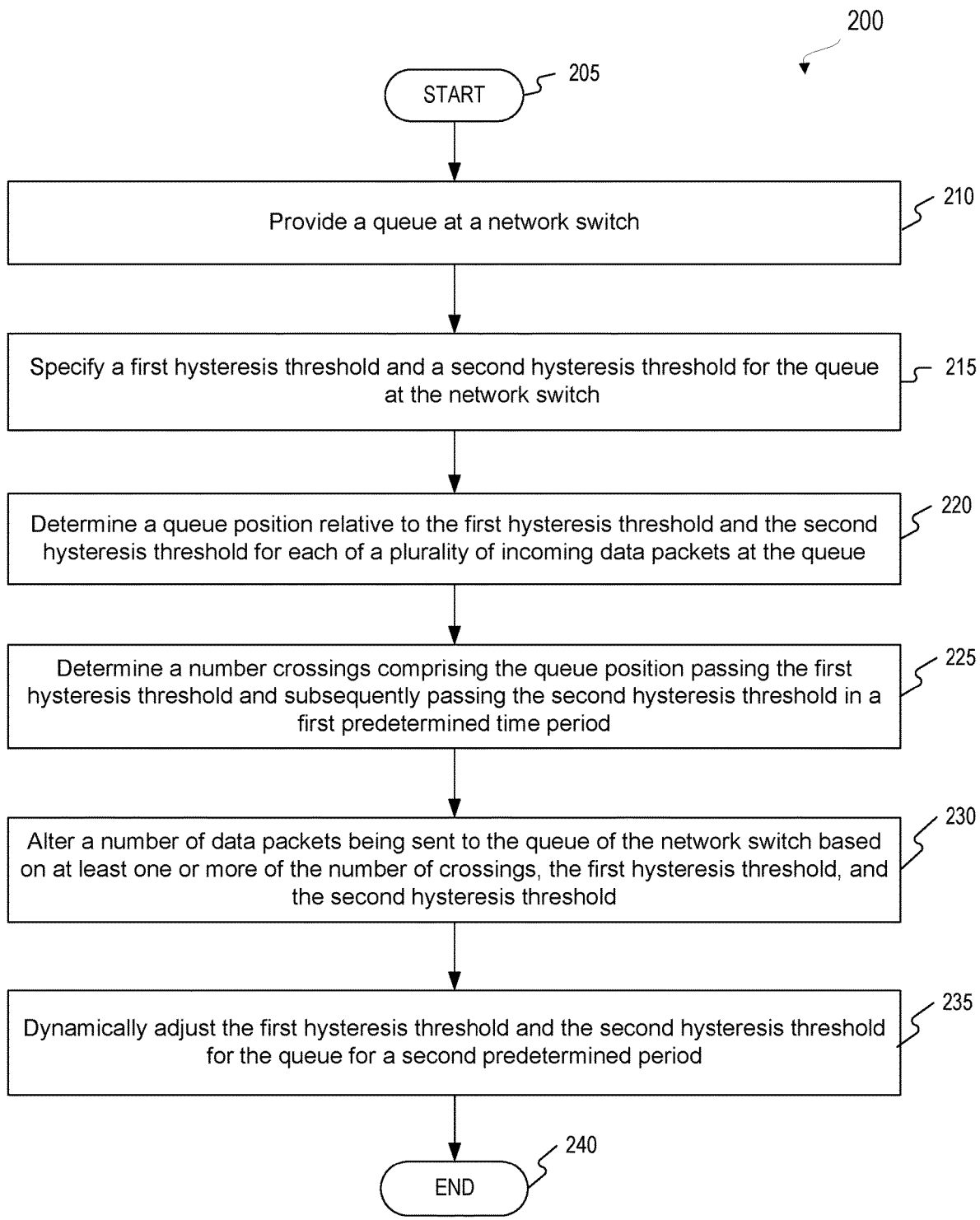
FIG. 2 is a flow chart of a method for providing telemetry for cloud switches queuing excursion.

FIG. 2 is a flow chart setting forth the general stages involved in a method 200 consistent with an embodiment of the disclosure for providing telemetry for cloud switches queuing excursion. Method 200 may be implemented by any of plurality of servers 105, plurality of leaf switches 110, or plurality of spine routers 115 as described above with respect to FIG. 1. A computing device 500 as described in more detail below with respect to FIG. 5 may comprise a working environment for any of plurality of servers 105, plurality of leaf switches 110, or plurality of spine routers 115. Ways to implement the stages of method 200 will be described in greater detail below.

Method 200 may begin at block 205 and proceed to block 210 where a queue at a network switch may be provided. The queue may be provided for incoming data packets at a port of the switch. The queue may be operative to store the incoming data packets for forwarding by the network switch. For example, a queue may be provided for each port of each of first spine switch 180 and second spine switch 185 for incoming data packets being received from one or more of first leaf switch 150, second leaf switch 155, third leaf switch 160, fourth leaf switch 165, fifth leaf switch 170, and sixth leaf switch 175. In example embodiments, each of first spine switch 180 and second spine switch 185 may include multiple network ports and a queue may be provided for each network port.

After providing the queue at block 210, method 200 may proceed to block 215 where a first hysteresis threshold and a second hysteresis threshold may be specified. The first hysteresis threshold and the second hysteresis threshold may be specified for each flow of the queue or for only one flow of the queue. Moreover, the first hysteresis threshold and the second hysteresis threshold may be specified for each of a queue size and a latency of the flow. The first hysteresis threshold may be lower than the second hysteresis threshold, with the gap between the first hysteresis threshold and the second hysteresis threshold being representative of a jitter of the queue. For example, a first hysteresis threshold and a second hysteresis threshold may be specified for the queue for data packets to be received at each of first spine switch 180 and second spine switch 185. In example embodiments, the first hysteresis threshold and the second hysteresis threshold may be representative of a load at each of first spine switch 180 and second spine switch 185.

Once having specified the first hysteresis threshold and the second hysteresis threshold at block 215, method 200 may proceed to block 220 where a queue position relative to the first hysteresis threshold and the second hysteresis threshold may be determined for each incoming data packet. The queue position may be determined based on a queue size, which may represent a number of data packets already enqueued in the queue before the incoming data packet. The incoming data packet may be tagged with the queue size.

In addition, the queue position may be determined based on a latency for the incoming data packet. For example, the incoming data packet may be tagged with an enqueueing time representing a time stamp at which the incoming data packet arrived at the queue. The latency for the data packet may be determined at the time of dequeueing of the data packet by determining a difference between the current time and the enqueueing time. In example embodiments, the determined queue size and the latency for the incoming data packets of the queue may be stored.

Figure 3:
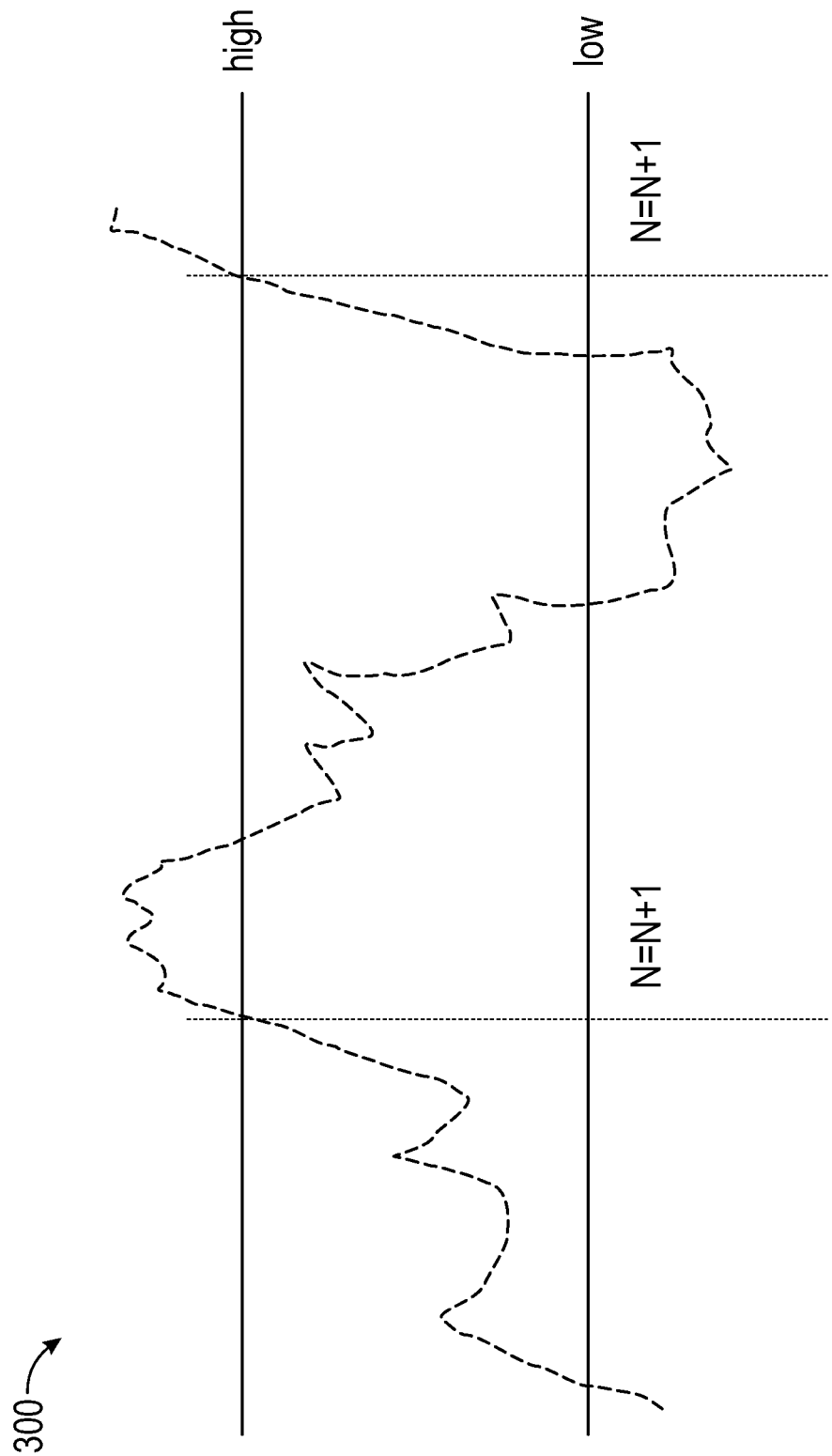
FIG. 3 is a graph illustrating of queue positions for incoming packets of a queue at a switch of a data center.

After determining the queue position for the incoming data packets at block 220, method 200 may proceed to block 225 where a number of crossings including the queue position passing the first hysteresis threshold and subsequently passing the second hysteresis threshold in a first predetermined time period may be determined. For example, a counter may be initiated at the network switch. The queue position for the incoming data packets may be compared with the first hysteresis threshold and the second hysteresis threshold for the queue and represented on a graph. FIG. 3 illustrates an example graph 300 representing example queue positions. The counter may be incremented when the queue position passes the first threshold and then subsequently passes the second threshold. In example embodiments, the counter may provide an indication of whether the load at the queue is constant or erratic (e.g., fluctuating).

Once having determined the number of crossings at block 225, method 200 may proceed to block 230 where a number of data packets being sent to the queue of the network switch may be altered based on one or more of the number of crossings, the first hysteresis threshold, and the second hysteresis threshold. For example, the number of data packets may be altered when the number of crossings for the first predetermined period is more than a predetermined value. Similarly, the number of data packets being sent to the network switch may be reduced when the second hysteresis threshold is higher than a predetermined level. Moreover, the number of data packets being sent to the network switch may be increased when the second hysteresis threshold is lower than a predetermined level. The number of data packets may be altered by directing a data packet traffic to or away from the network switch.

Once having altered the number of data packets for the queue at block 230, method 200 may proceed to block 235 where each of the first hysteresis threshold and the second hysteresis threshold may be adjusted for a second predetermined time period. For example, the first hysteresis threshold and the second hysteresis threshold may be adjusted for a next predetermined time period immediately following the first predetermined period. The first hysteresis threshold and the second hysteresis threshold may be adjusted based on historical data representing a number of passing for the first hysteresis threshold and the second hysteresis by the queue positions.

Figure 4:
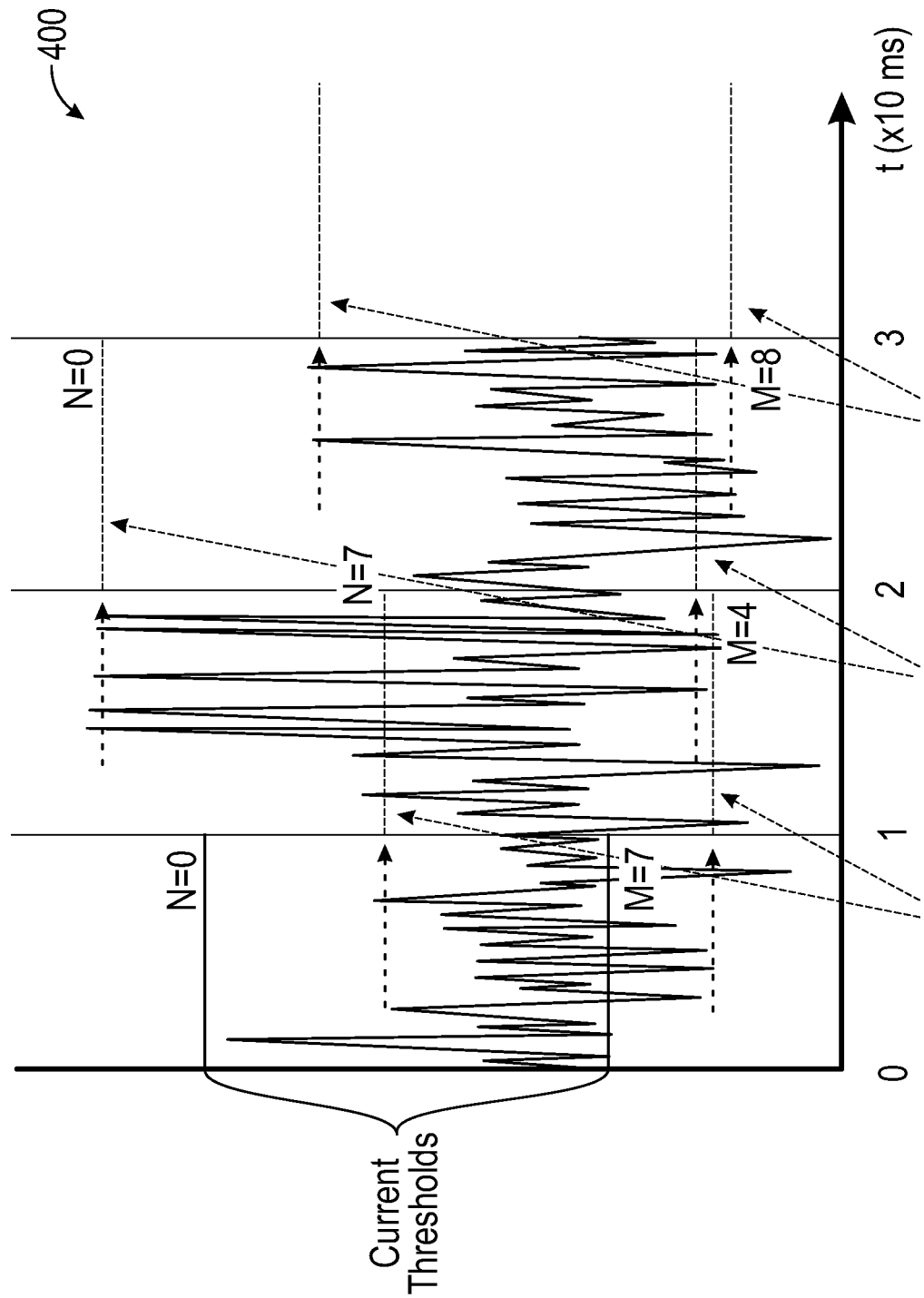
FIG. 4 is a graph illustrating dynamic adjustment of hysteresis thresholds for a flow of the queue at a switch of a data center.

FIG. 4 illustrates an example graph 400 showing the adjustment of the first hysteresis threshold and the second hysteresis threshold. As shown in FIG. 4, in a first predetermined time period, represented by 0 to 1, the first threshold is passed seven times (i.e., M=7) while the second threshold is passed zero times (i.e., N=0). Hence, for the second predetermined time period, represented by 1 to 2, the first hysteresis threshold and the second hysteresis threshold are lowered. The first hysteresis threshold and second hysteresis threshold may be lowered by an amount reflective of an integral of the queue positions relative to the first hysteresis threshold and the second hysteresis threshold. As shown in FIG. 4, during the second predetermined time period (i.e., 1 to 2), the first hysteresis threshold is passed four times (i.e., M=4) while the second hysteresis threshold is passed seven time (i.e., N=7). Hence, for a third predetermined time period following the second predetermined period and represented by 2 to 3, the first hysteresis threshold and the second hysteresis threshold are increased. The first hysteresis threshold and the second hysteresis threshold are increased by an amount reflective of an integral of the queue positions relative to the first hysteresis threshold and the second hysteresis threshold. As shown in FIG. 4, after the increase during the third predetermined time period (i.e., 2 to 3), the first hysteresis threshold is passed eight times (i.e., M=8) while the second hysteresis threshold is not passed (i.e. N=7).

In example embodiments, the first hysteresis threshold and the second hysteresis threshold may be adjusted for a following time period by predicting the queue positions of the incoming data packets. The queue positions may be predicted by employing a learning process. The learning process may be trained and reinforced using historical data of the first hysteresis threshold and the second hysteresis threshold. The trained learning process may be then used to predict the first hysteresis threshold and the second hysteresis threshold, which may represent the latency and the load on the network switch for the upcoming period. One or more corrective actions may be implemented to balance the latency. For example, additional data packet traffic may be directed to the queue when the predicted latency is less than that of another queue or an expected latency. In contrast, one or more data packet traffic may be directed away from the queue when the predicted latency is more than that of another queue or the expected latency. In addition, the network switch may be flagged for further analysis when the predicted latency is more than that of another queue or the expected latency.

Accordingly, as illustrated by FIG. 4, the first hysteresis threshold and the second hysteresis threshold may be mobile; for example, they may evolve with the integral of the queue level curve (e.g., taking the aggregate queue levels over 10 ms). As a result, if the queue gets less used, the hysteresis thresholds may go down, and reciprocally, if the queue gets more used, the hysteresis thresholds may go up and more widely spaced. This may result in the hysteresis thresholds staying relevant to the amount of traffic and may be still traversed on a regular basis so the counters may keep counting.

While embodiments of the disclosure are not limited to may particular machine learning technique, classical reinforcement learning may be use to correlate the values obtained and the effects on the network (e.g., to predict and avoid incast/congestion loss. If the machine learning report is large enough, a history of the hysteresis thresholds may be maintained that may provide a hint on the queue behavior over the last second. Aggregating every 10 ms, for example, may give one hundred points per second for each hysteresis threshold. The result may comprise dense and informative information on the queue operation. After adjusting the first hysteresis threshold and the second hysteresis threshold at block 235, method 200 may terminate at END block 240.

Embodiments of the disclosure may provide a dense and information-rich way of reporting the queue activity in a datacenter switch. The hysteresis thresholds may act as hysteresis boundaries and a count may be maintained of how many times the high level (i.e., second hysteresis threshold) and then the low level (i.e., first hysteresis threshold) are passed. The levels and their distance may vary with the integral of the use. The more time the queue stays above the high level the higher the high level may become. The low level may follow the high level lazily, the distance between the two may grow with the high level. At the time of the measurement, the value of the two levels may be an indication of the queue history that may be fed in learning machines for example.

According to embodiments, a method may include specifying a first hysteresis threshold and a second hysteresis threshold for a queue of a network switch; determining a queue position relative to the first hysteresis threshold and the second hysteresis threshold for each of a plurality of incoming packets at the queue; determining a number of crossings comprising the queue position passing the first hysteresis threshold and subsequently passing the second hysteresis threshold in a first predetermined time period; and altering a number of the plurality of incoming data packets at the queue based on at least one of the following: the number of crossings, the first hysteresis threshold, and the second hysteresis threshold.

The method may further include modifying the first hysteresis threshold and the second hysteresis threshold for the queue at the network switch for a second predetermined time period based on the number of crossings in the first predetermined time period. Modifying the first hysteresis threshold and the second hysteresis threshold may include lowering the first hysteresis threshold and the second hysteresis threshold when the number of crossings in the first predetermined time period is less than a predetermined number. Lowering the first hysteresis threshold and the second hysteresis threshold may include lowering the first hysteresis threshold more than the second hysteresis threshold.

According to example embodiments, modifying the first hysteresis threshold and the second hysteresis threshold may include increasing the first hysteresis threshold and the second hysteresis threshold when the number of crossings in the first predetermined time period is more than a predetermined number. Increasing the first hysteresis threshold and the second hysteresis threshold may include increasing the first hysteresis threshold more than the second hysteresis threshold. Moreover, modifying the first hysteresis threshold and the second hysteresis threshold may include modifying the first hysteresis threshold and the second hysteresis threshold through machine learning. In addition, modifying the first hysteresis threshold and the second hysteresis threshold comprises predicting the first hysteresis threshold and the second hysteresis threshold based on a historical data corresponding to the first hysteresis threshold and the second hysteresis threshold.

In example embodiments, altering the number of the plurality of incoming data packets being sent to the queue may include decreasing the number of the plurality of incoming data packets being sent to the queue when the second hysteresis threshold is greater than a predetermined value. Moreover, altering the number of the plurality of incoming data packets being sent to the queue of the network switch may include increasing the number of the plurality of incoming data packets being sent to the queue when the second hysteresis threshold is less than a predetermined value.

According to example embodiments, an apparatus may include a memory storage and a processing unit coupled to the memory storage. The processing unit may be operative to provide a queue at a port; specify a first hysteresis threshold and a second hysteresis threshold for the queue; and determine a queue position relative to the first hysteresis threshold and the second hysteresis threshold for each of a plurality of incoming data packets at the queue. The processing unit may further be operative to determine a number of crossings comprising the queue position passing the first hysteresis threshold and subsequently passing the second hysteresis threshold in a first predetermined time period; and alter a number of the plurality of incoming data packets based on at least one of the number of crossings, the first hysteresis threshold, and the second hysteresis threshold.

Embodiments of the disclosure may provide a non-transitory computer readable medium that stores a set of instructions. The set of instructions when executed by perform a method including specifying a first hysteresis threshold and a second hysteresis threshold for a latency of a queue at a network switch; determining the latency for each of a plurality of data packets being received at the queue; and determining a relative position of the latency with respect to the first hysteresis threshold and the second hysteresis threshold for each of the plurality of data packets. The set of instructions when executed perform the method further including determining a number of crossings comprising the relative position passing the first hysteresis threshold and subsequently passing the second hysteresis threshold in a first predetermined time period and altering a number of the plurality of data packets being received at the queue based on at least one of the number of crossings, the first hysteresis threshold, and the second hysteresis threshold.

Figure 5:
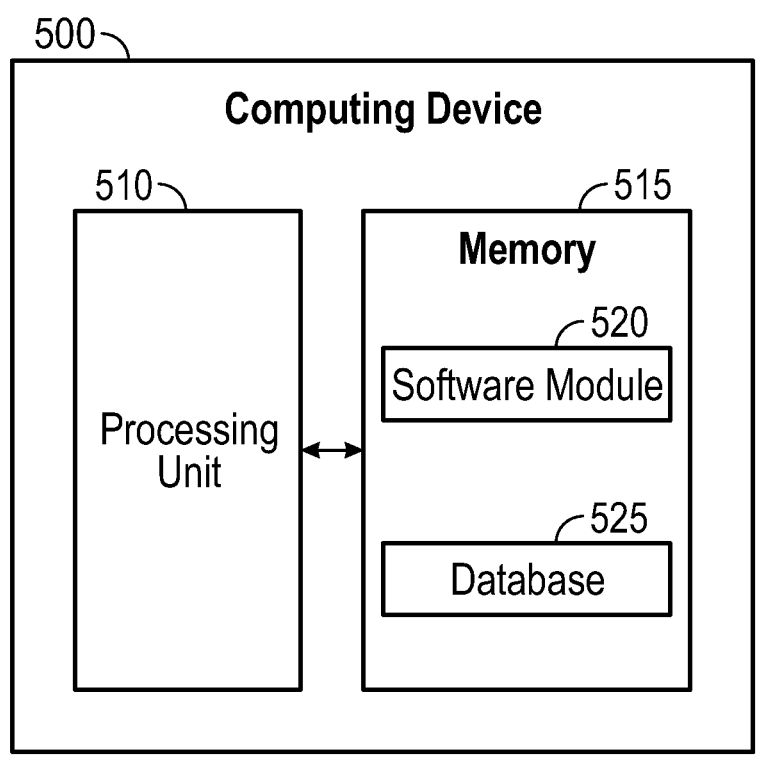
FIG. 5 is a block diagram of a computing device.

FIG. 5 shows computing device 500. As shown in FIG. 5, computing device 500 may include a processing unit 510 and a memory unit 515. Memory unit 515 may include a software module 520 and a database 525. While executing on processing unit 510, software module 520 may perform processes for providing telemetry for cloud switches queuing excursion, including for example, any one or more of the stages from method 200 described above with respect to FIG. 2. Computing device 500, for example, may provide an operating environment for plurality of servers 105, plurality of leaf switches 110, and plurality of spine routers 115. Plurality of servers 105, plurality of leaf switches 110, and plurality of spine routers 115 may operate in other environments and are not limited to computing device 500.

Computing device 500 may be implemented using a personal computer, a network computer, a mainframe, a router, or other similar microcomputer-based device. Computing device 500 may comprise any computer operating environment, such as hand-held devices, multiprocessor systems, microprocessor-based or programmable sender electronic devices, minicomputers, mainframe computers, and the like. Computing device 500 may also be practiced in distributed computing environments where tasks are performed by remote processing devices. The aforementioned systems and devices are examples and computing device 500 may comprise other systems or devices.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Moreover, the semantic data consistent with embodiments of the disclosure may be analyzed without being stored. In this case, in-line data mining techniques may be used as data traffic passes through, for example, a caching server or network router. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where each or many of the components illustrated in FIG. 1 may be integrated onto a single integrated circuit. Such an SOC device may include one or more processing units, graphics units, communications units, system virtualization units and various application functionality all of which may be integrated (or "burned") onto the chip substrate as a single integrated circuit. When operating via an SOC, the functionality described herein with respect to embodiments of the disclosure, may be performed via application-specific logic integrated with other components of computing device 500 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A method comprising:
specifying a first hysteresis threshold and a second hysteresis threshold for a queue of a network switch;
determining a queue position relative to the first hysteresis threshold and the second hysteresis threshold for each of a plurality of incoming data packets at the queue;
determining a number of crossings comprising the queue position passing the first hysteresis threshold and subsequently passing the second hysteresis threshold in a first predetermined time period; and
altering a number of the plurality of incoming data packets at the queue based on at least one of the following: the number of crossings, the first hysteresis threshold, and the second hysteresis threshold.

2. The method of claim 1, further comprising:
modifying the first hysteresis threshold and the second hysteresis threshold for the queue at the network switch for a second predetermined time period based on the number of crossings in the first predetermined time period.

3. The method of claim 2, wherein modifying the first hysteresis threshold and the second hysteresis threshold comprises lowering the first hysteresis threshold and the second hysteresis threshold when the number of crossings in the first predetermined time period is less than a predetermined number.

4. The method of claim 3, wherein lowering the first hysteresis threshold and the second hysteresis threshold comprises lowering the first hysteresis threshold more than the second hysteresis threshold.

5. The method of claim 2, wherein modifying the first hysteresis threshold and the second hysteresis threshold comprises increasing the first hysteresis threshold and the second hysteresis threshold when the number of crossings in the first predetermined time period is more than a predetermined number.

6. The method of claim 5, wherein increasing the first hysteresis threshold and the second hysteresis threshold comprises increasing the first hysteresis threshold more than the second hysteresis threshold.

7. The method of claim 2, wherein modifying the first hysteresis threshold and the second hysteresis threshold comprises modifying the first hysteresis threshold and the second hysteresis threshold through machine learning.

8. The method of claim 2, wherein modifying the first hysteresis threshold and the second hysteresis threshold comprises predicting the first hysteresis threshold and the second hysteresis threshold based on a historical data corresponding to the first hysteresis threshold and the second hysteresis threshold.

9. The method of claim 1, wherein altering the number of the plurality of incoming data packets being sent to the queue comprises decreasing the number of the plurality of incoming data packets being sent to the queue when the second hysteresis threshold is greater than a predetermined value.

10. The method of claim 1, wherein altering the number of the plurality of incoming data packets being sent to the queue of the network switch comprises increasing the number of the plurality of incoming data packets being sent to the queue when the second hysteresis threshold is less than a predetermined value.

11. An apparatus comprising:
a memory storage; and
a processing unit coupled to the memory storage, wherein the processing unit is configured to:
provide a queue at a port;
specify a first hysteresis threshold and a second hysteresis threshold for the queue;
determine a queue position relative to the first hysteresis threshold and the second hysteresis threshold for each of a plurality of incoming data packets at the queue;

determine a number of crossings comprising the queue position passing the first hysteresis threshold and subsequently passing the second hysteresis threshold in a first predetermined time period; and alter a number of the plurality of incoming data packets based on at least one of the following: the number of crossings, the first hysteresis threshold, and the second hysteresis threshold.

12. The apparatus of claim 11, wherein the processing unit being configured to determine the queue position comprises the processing unit being configured to:

determine a latency of each of the plurality of incoming data packets for the queue; and compare the determined latency with the first hysteresis threshold and the second hysteresis threshold.

13. The apparatus of claim 12, wherein the processing unit being configured to determine the latency of each of the plurality of incoming data packets for the queue comprises the processing unit being configured to:

tag each of the plurality of incoming packets with a time of enqueueing; and determine the latency at dequeueing of each of the plurality of incoming packets as an amount of time since the time of enqueueing.

14. The apparatus of claim 11, wherein the queue is provided at the port of a spine switch of a data center network.

15. The apparatus of claim 14, wherein the spine switch is configured to receive the plurality of incoming packets from one or more leaf switches of the data center network.

16. A non-transitory computer readable medium that stores a set of instructions which when executed perform a method executed by the set of instructions comprising:

specifying a first hysteresis threshold and a second hysteresis threshold for a latency of a queue at a network switch;

determining the latency for each of a plurality of data packets being received at the queue;

determining a relative position of the latency with respect to the first hysteresis threshold and the second hysteresis threshold for each of the plurality of data packets;

determining a number of crossings comprising the relative position passing the first hysteresis threshold and subsequently passing the second hysteresis threshold in a first predetermined time period; and altering a number of the plurality of data packets being received at the queue based on at least one of the following: the number of crossings, the first hysteresis threshold, and the second hysteresis threshold.

17. The non-transitory computer readable medium of claim 16, wherein specifying the first hysteresis threshold and the second hysteresis threshold for the latency of the queue comprises specifying the first hysteresis threshold and the second hysteresis threshold for the latency of the queue based on a historical data of the first hysteresis threshold and the second hysteresis threshold for the queue.

18. The non-transitory computer readable medium of claim 16, wherein determining the latency for each of the plurality of data packets comprises:

tagging each of the plurality of data packets with a time of enqueueing; and determining the latency at dequeueing of each of the plurality of data packets as an amount of time since the time of enqueueing.

19. The non-transitory computer readable medium of claim 16, wherein altering the number of the plurality of data packets being received at the queue comprises decreasing the number of the plurality of data packets in response to determining that the number of crossings is more than a predetermined value.

20. The non-transitory computer readable medium of claim 16, wherein altering the number of the plurality of data packets being received at the queue comprises decreasing the number of the plurality of data packets in response to determining that the second hysteresis threshold is greater than a predetermined value.

* * * * *